US012573049B2

(12) United States Patent
Kong et al.

(10) Patent No.: US 12,573,049 B2
(45) Date of Patent: Mar. 10, 2026

(54) POINT CLOUD SEGMENTATION METHOD AND APPARATUS, DEVICE, AND STORAGE MEDIUM

(71) Applicant: BEIJING BYTEDANCE NETWORK TECHNOLOGY CO., LTD., Beijing (CN)

(72) Inventors: Tao Kong, Beijing (CN); Ruihang Chu, Beijing (CN); Lei Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 374 days.

(21) Appl. No.: 18/249,205

(22) PCT Filed: Sep. 27, 2021

(86) PCT No.: PCT/CN2021/120919
§ 371 (c)(1),
(2) Date: Apr. 14, 2023

(87) PCT Pub. No.: WO2022/078197
PCT Pub. Date: Apr. 21, 2022

(65) Prior Publication Data
US 2023/0394669 A1 Dec. 7, 2023

(30) Foreign Application Priority Data

Oct. 16, 2020 (CN) .......................... 202011112395.6

(51) Int. Cl.
*G06T 7/11* (2017.01)
*G06V 10/44* (2022.01)
(Continued)

(52) U.S. Cl.
CPC ................ *G06T 7/11* (2017.01); *G06V 10/44* (2022.01); *G06V 10/806* (2022.01); *G06V 10/82* (2022.01);
(Continued)

(58) Field of Classification Search
CPC ...... G06V 10/44; G06V 10/806; G06V 10/82; G06V 20/58; G06T 2207/10028;
(Continued)

(56) References Cited

U.S. PATENT DOCUMENTS 11,176,693 B1 * 11/2021 Gonzalez-Nicolas ......................
G06V 10/82
2016/0117858 A1 4/2016 Wu et al.
(Continued)

FOREIGN PATENT DOCUMENTS

CN 106408011 A 2/2017
CN 109741329 A 5/2019
(Continued)

OTHER PUBLICATIONS

Ghazvinian Zanjani et al. "Deep Learning Approach to Semantic Segmentation in 3D Point Cloud Intra-oral Scans of Teeth," Proceedings of Machine Learning Research 102:557-571. (Year: 2019).*
(Continued)

*Primary Examiner* — Kenny A Cese

(57) ABSTRACT

Provided are a point cloud segmentation method and apparatus, a device, and a storage medium. The point cloud segmentation method includes: acquiring a to-be-processed point cloud; obtaining, in a gridding scenario space to which respective point in the point cloud belongs, a target grid corresponding to the respective point through a pre-trained neural network, wherein the pre-trained neural network is obtained by training a sample point cloud and a sample target grid corresponding to the sample point cloud in a
(Continued)

sample gridding scenario space; and outputting a point cloud corresponding to a respective instance according to an instance category corresponding to the target grid, wherein the same target grid has the same instance category.

18 Claims, 4 Drawing Sheets

(51) Int. Cl.
  *G06V 10/80* (2022.01)
  *G06V 10/82* (2022.01)
(52) U.S. Cl.
  CPC ............... *G06T 2207/20081* (2013.01); *G06T 2207/20084* (2013.01)
(58) Field of Classification Search
  CPC . G06T 2207/20081; G06T 2207/20084; G06T 2207/30261; G06T 7/11
  USPC ......................................................... 382/173
  See application file for complete search history.

(56) References Cited

U.S. PATENT DOCUMENTS

| | | | | |
|---|---|---|---|---|
| 2020/0090357 A1* | 3/2020 | Pagé-Caccia | ............. | G06T 7/50 |
| 2020/0151557 A1 | 5/2020 | Nezhadarya et al. | | |
| 2022/0245911 A1* | 8/2022 | Hu | ......................... | G06T 19/20 |

FOREIGN PATENT DOCUMENTS

| CN | 109886272 | A | 6/2019 |
|---|---|---|---|
| CN | 111310765 | A | 6/2020 |
| CN | 111339876 | A | 6/2020 |
| CN | 112258512 | A | 1/2021 |
| JP | 7567049 | B2 | 10/2024 |
| WO | 2020/173297 | A1 | 9/2020 |

OTHER PUBLICATIONS

Search Report issued Dec. 30, 2021 for PCT Application No. PCT/CN2021/120919 (4 pages).

Bo., X., et al., Augmentation method of a small object semantic segmentation based on LiDAR point clouds, Laser Journal, vol. 41, No. 4, 2020, English Abstract (6 pages).

Office Action mailed Jan. 19, 2023 in CN Appl. No. 202011112395. 6, English translation (6 pages).

International Search Report for International Application No. PCT/CN2021/117199, mailed Dec. 17, 2021, 5 pages.

Written Opinion for International Application No. PCT/CN2021/120919, mailed Dec. 30, 2021, 8 Pages.

Office action received from Japanese patent application No. 2023-521505 mailed on Feb. 27, 2024, 6 pages (3 pages English Translation and 3 pages Original Copy).

Zhang et al., "A Review of Deep Learning-Based Semantic Segmentation for Point Cloud", IEEE, vol. 7, No. 1, Dec. 10, 2019, pp. 179118-179133.

* cited by examiner

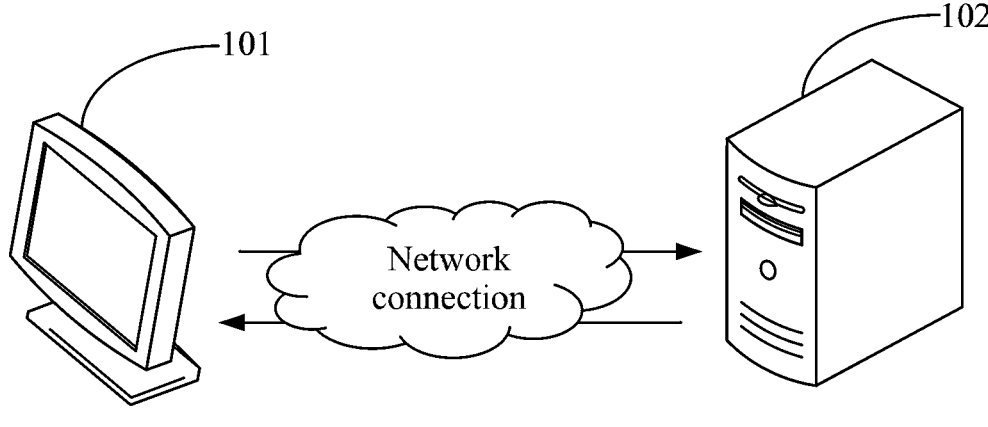

FIG. 1

| S201 |
|------|
| Acquire a to-be-processed point cloud |

↓

| S202 |
|------|
| Obtain, in a gridding scenario space to which a respective point in the point cloud belongs, a target grid corresponding to the respective point through a pre-trained neural network |

↓

| S203 |
|------|
| Output a point cloud corresponding to a respective instance according to an instance category corresponding to the target grid, wherein the same target grid has the same instance category |

FIG. 2

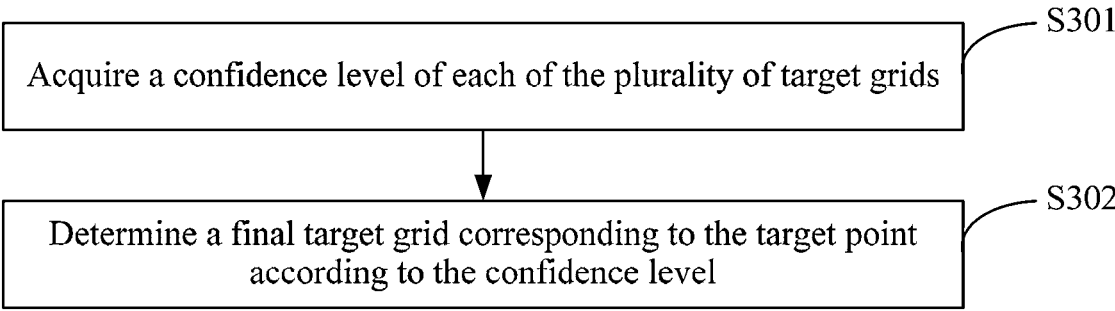

FIG. 3

POINT CLOUD SEGMENTATION METHOD AND APPARATUS, DEVICE, AND STORAGE MEDIUM

CROSS-REFERENCES TO RELATED APPLICATIONS

This is a National Stage Application, filed under 35 U.S.C. 371, of International Patent Application No. PCT/CN2021/120919, filed on Sep. 27, 2021, which claims priority to Chinese Patent Application No. 202011112395.6 filed with the China National Intellectual Property Administration (CNIPA) on Oct. 16, 2020, the disclosure of which is incorporated herein by reference in its entirety.

TECHNICAL FIELD

The present application relates to the field of computer technologies, for example, a point cloud segmentation method and apparatus, a device, and a storage medium.

BACKGROUND

With the development of computer technologies, the number of digital images grows with each passing day. It is significantly important to recognize digital images correctly for technical fields such as autonomous driving and robot control. Digital images can be represented by point cloud data and thus point cloud segmentation is also an important branch of digital image processing technology.

In the point cloud segmentation such as instance segmentation, the "top-down" segmentation method can usually be adopted. The "top-down" segmentation method is to predict multiple three-dimensional bounding boxes to represent different instances and then find the points belonging to a respective instance by binary classification in each bounding box. However, in such a method, a large number of redundant bounding boxes are required to be removed, resulting in low efficiency of point cloud segmentation; meanwhile, the classification effect of the point cloud also depends on the accuracy of the bounding box prediction in the previous stage.

SUMMARY

The present application provides a point cloud segmentation method and apparatus, a device, and a storage medium to solve the technical problems of low point cloud segmentation efficiency and low point cloud segmentation accuracy.

A point cloud segmentation method is provided. The method includes the following steps.

A to-be-processed point cloud is acquired.

A target grid corresponding to a respective point in the point cloud in a gridding scenario space to which respective point belongs is obtained through a pre-trained neural network, where the pre-trained neural network is obtained by training a sample point cloud and a sample target grid corresponding to the sample point cloud in a sample gridding scenario space.

A point cloud corresponding to respective instance is outputted according to an instance category corresponding to the target grid, where the same target grid has the same instance category.

A point cloud segmentation apparatus is further provided. The apparatus includes a first acquisition module, a prediction module, and an output module.

The first acquisition module is configured to acquire a to-be-processed point cloud.

The prediction module is configured to obtain, in a gridding scenario space to which a respective point in the point cloud belongs, a target grid corresponding to respective point through a pre-trained neural network, where the pre-trained neural network is obtained by training a sample point cloud and a sample target grid corresponding to the sample point cloud in a sample gridding scenario space.

The output module is configured to output a point cloud corresponding to respective instance according to an instance category corresponding to the target grid, where the same target grid has the same instance category.

An electronic device is further provided. The electronic device includes a memory and a processor.

The memory is configured to store a computer program, and the processor, when executing the computer program, performs the point cloud segmentation method provided in the embodiments of the present application.

A computer-readable storage medium is further provided. The computer-readable storage medium includes a memory and a processor. The memory is configured to store a computer program, and the processor, when executing the computer program, performs the point cloud segmentation method provided in the embodiments of the present application.

BRIEF DESCRIPTION OF DRAWINGS

FIG. 1 is a diagram of the application environment of a point cloud segmentation method according to an embodiment of the present application;

FIG. 2 is a flowchart of a point cloud segmentation method according to an embodiment of the present application;

FIG. 3 is another flowchart of a point cloud segmentation method according to an embodiment of the present application;

DETAILED DESCRIPTION

Figure 4:
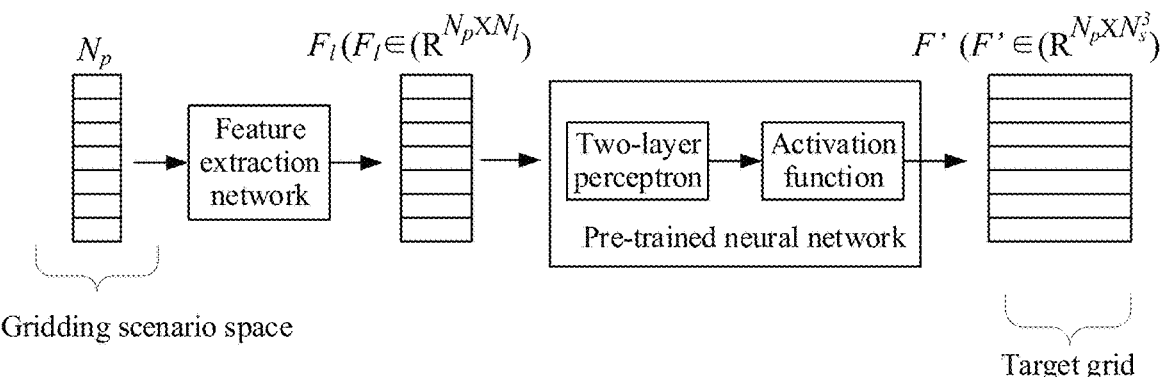
FIG. 4 is a diagram illustrating a principle of a point cloud segmentation process according to an embodiment of the present application.

Embodiments of the present disclosure will be described below with reference to the drawings. Although some embodiments of the present disclosure are illustrated in the drawings, the present disclosure may be embodied in various forms and should not be construed as limited to the embodiments set forth herein. Rather, these embodiments are provided so that the present disclosure will be understood. The drawings and embodiments of the present disclosure are for illustrative purposes and are not intended to limit the scope of the present disclosure.

The various steps recited in method embodiments of the present disclosure may be performed in a different order and/or in parallel. In addition, the method embodiments may include additional steps and/or omit performing illustrated steps. The scope of the present disclosure is not limited in this respect.

As used herein, the term "comprise" and variations thereof are intended to be open-ended terms, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

Concepts such as "first" and "second" in the present disclosure are intended to distinguish one apparatus, module or unit from another and are not intended to limit the order or interrelationship of the functions performed by the apparatus, module or unit.

"One" and "a plurality" mentioned in the present disclosure are illustrative and not limiting, and should be understood as "one or more" unless stated in the context.

The names of messages or information exchanged between multiple apparatuses in the embodiments of the present disclosure are for illustrative purposes and are not intended to limit the scope of such messages or information.

FIG. 1 is a diagram of the application environment of a point cloud segmentation method according to an embodiment of the present application. With reference to FIG. 1, the point cloud segmentation method is applied to a point cloud segmentation system. The point cloud segmentation system may include a terminal 101 and a server 102. The terminal 101 and the server 102 are connected via a wireless network or a wired network. The terminal 101 may be a desktop terminal or a mobile terminal. Optionally, the mobile terminal may be at 5 least one of a personal digital assistant (PDA), a portable Android device (PAD), a personal multimedia player (PMP), a vehicle-mounted terminal (for example, a vehicle-mounted navigation terminal) or a mobile phone. The server 102 may be a standalone server or a server cluster composed of multiple servers.

The point cloud segmentation method provided in this embodiment of the present application may be separately performed by the terminal 101 or the server 102 or may be jointly performed by the terminal 101 and the server 102. The method embodiment below is illustrated by using an example in which the execution subject is an electronic device (the electronic device is the terminal 101 and/or the server 102).

The following briefly describes some concepts involved in the embodiments of the present application.

An instance is a specific object of a category. One specific object may be considered as one instance. An instance category refers to the category of a specific object. For example, the instance is an object 1, an object 2, an object 3, and the like. Instance segmentation may be to segment a point cloud into one or more non-overlapping point groups that belong to one specific object, and one point group corresponds to one instance. For example, in a two-dimensional image or a three-dimensional scenario, the points which belong to one specific object can be distinguished from the points which belong to another specific object.

FIG. 2 is a flowchart of a point cloud segmentation method according to an embodiment of the present application. This embodiment relates to a process where an electronic device implements point cloud segmentation through a single-stage point-by-point classification manner. As shown in FIG. 2, the method may include steps S201, S202, and S203.

In S201, a to-be-processed point cloud is acquired.

The to-be-processed point cloud refers to a point cloud that needs to be subjected to instance segmentation. The point cloud in this embodiment of the present application may include a two-dimensional point cloud or a three-dimensional point cloud. The two-dimensional point cloud may be a set of multiple pixels in a two-dimensional image, and the three-dimensional point cloud may be a set of multiple three-dimensional points in a three-dimensional scenario.

The point cloud segmentation method provided in this embodiment of the present application has broad application prospects and has great potential in the fields such as autonomous driving, robot control, augmented reality, and the like. The electronic device may acquire the to-be-processed point cloud from front-end scanning devices of various application fields. The front-end scanning device may also upload scanned point clouds to the cloud, and the electronic device downloads a point cloud that needs to be subjected to instance segmentation from the cloud.

In S202, a target grid corresponding to respective point in the point cloud in a gridding scenario space to which respective point belongs is obtained through a pre-trained neural network.

The pre-trained neural network is obtained by training a sample point cloud and a sample target grid corresponding to the sample point cloud in a sample gridding scenario space.

In practical application, considering that objects in a scenario space do not overlap each other and that different object instances occupy different locations in the scenario space, a scenario space to which the point cloud belongs may be gridded in advance, and different grids are defined to correspond to different instance categories. For example, the scenario space to which the point cloud belongs may be divided into multiple grids (for example, $N_s * N_s * N_s$ grids) in advance, and each grid occupies a specific location and represents one instance category. If the center point of one object instance (the coordinates of the center point are the average of the coordinates of all points in the object instance) is located within one grid, all points belonging to the object instance are classified into the grid, that is, all points are classified into the instance category corresponding to the grid.

Based on the above, the point-by-point classification of the preceding point cloud can be achieved through the pre-trained neural network. Therefore, the pre-trained neural network needs to be trained using a large volume of training data. In the training process of the pre-trained neural network, the pre-trained neural network may be trained using a large number of sample point clouds and samples target grids corresponding to the sample point clouds in the sample gridding scenario space. A sample scenario space may be gridded to obtain the sample gridding scenario space. Meanwhile, the instance category corresponding to a respective grid in the sample gridding scenario space is defined, and different grids correspond to different instance categories. The sample point cloud is acquired, and the sample target grid corresponding to a respective point in the sample point cloud in the gridding scenario space is marked to obtain the training data for the pre-trained neural network (that is, the sample point cloud and the sample target grid corresponding to the sample point cloud in the sample gridding scenario space). The training data is used to train the pre-trained neural network.

In this manner, after the pre-trained neural network of the gridding scenario space is obtained, the electronic device may input the to-be-processed point cloud into the pre-trained neural network, and the target grid corresponding to a respective point in the point cloud in the gridding scenario space to which the respective point belongs is predicted through the pre-trained neural network.

To facilitate the processing performed by the pre-trained neural network on the point cloud, optionally, after the to-be-processed point cloud is acquired, the electronic device may further combine a coordinate feature and a channel feature of each point in the point cloud to obtain an initial feature of each point and extracts a local feature of each point from the initial feature of each point through a feature extraction network.

The coordinate feature of a point may be the coordinate location of the point. The channel feature of a point may be a channel value of the point, such as a color channel value (a red, green and blue (RGB) value). The operation of combining the coordinate feature and the channel feature may be the operation of splicing each coordinate location and each channel value, so as to obtain the initial feature for each point. The initial feature herein may be in the form of a matrix, that is, an initial feature matrix. The electronic device inputs the initial feature matrix into the feature extraction network to extract the local feature of each point. The local feature herein may be a high-dimensional expression of the feature of the point cloud, and the local feature covers the information of the entire point cloud. The local feature may also be in the form of a matrix, that is, a local feature matrix. The electronic device inputs the local feature matrix into the pre-trained neural network, projects the local feature matrix into a feature space for instance classification, and outputs the target grid corresponding to a respective point in the gridding scenario space to which the respective point belongs.

In an optional embodiment, the electronic device may select a deep learning network as the feature extraction network. The feature extraction network may be the first half of a PointNet network, the first half of a PointNet++ network, the first half of a PointConv network, or other network structures.

In S203, a point cloud corresponding to a respective instance is outputted according to an instance category corresponding to the target grid, where the same target grid has the same instance category.

Since the instance categories corresponding to the grids in the scenario space to which the point cloud belongs are pre-defined and the instance categories corresponding to different grids are different, after the target grid corresponding to a respective point in the point cloud in the gridding scenario space to which the respective point belongs is obtained, the electronic device may divide each point in the point cloud into a corresponding object instance based on the instance category corresponding to the target grid and output the point cloud corresponding to a respective object instance.

In the point cloud segmentation method provided in this embodiment of the present application, after the to-be-processed point cloud is acquired, the electronic device obtains the target grid corresponding to a respective point in the point cloud in the gridding scenario space to which the respective point belongs through the pre-trained neural network and outputs the point cloud corresponding to the respective instance according to the instance category corresponding to the target grid. In the process of point cloud segmentation, since the electronic device can directly predict the target grid corresponding to a respective point in the point cloud in the gridding scenario space to which the respective point belongs through the pre-trained neural network and the instance category of the same target grids is the same, each point in the point cloud is directly classified into a clear and specific instance category in the single-stage point-by-point classification manner, thereby avoiding the accumulation of errors brought by multiple stages and improving the accuracy of the segmentation result. Meanwhile, the loss of the computation amount caused by the removal of a large number of redundant bounding boxes in the first stage is avoided, thereby improving the efficiency of point cloud segmentation.

In practical application, such a case where one target point in the predicted point cloud corresponds to multiple target grids may exist, and thus the target point needs to be clearly classified into the corresponding target grids. For the processing of the preceding case, reference may be made to the process described in the following embodiment. Optionally, on the basis of the preceding embodiments, as shown in FIG. 3, when one target point corresponds to multiple target grids, the method may further include steps S301 and S302 before S203.

In S301, a confidence level of each target grid of the multiple target grids is acquired.

After the scenario space where the point cloud belongs is gridded, most grids included in the gridding scenario space do not correspond to real object instances, and only a few grids correspond to real object instances. Therefore, one confidence level may be calculated for each grid. The higher the confidence level of the grid, the greater the probability that the grid corresponds to a real object instance, and the lower the confidence level of the grid, the smaller the probability that the grid corresponds to a real object instance.

In this manner, when multiple target grids corresponding to one target point are obtained through the pre-trained neural network, the electronic device may separately acquire the confidence level of each target grid. As an optional embodiment, the electronic device may acquire the confidence level of each target grid of the multiple target grids through the following process, and S301 may include steps S3011, S3012 and S3013.

In S3011, for each target grid, multiple correlated points closest to a center point of the target grid are selected from the point cloud.

The features of the multiple correlated points closest to the center point of the target grid may characterize the features of the target grid, and therefore, the electronic device may select multiple correlated points closest to the center point of the target grid to calculate the confidence level of the target grid. In practical application, the number of the selected correlated points may be set according to actual requirements. Optionally, 32 points closest to the center point may be selected to participate in the calculation process of the confidence level.

In S3012, features of the multiple correlated points are aggregated to obtain an aggregation feature of each target grid.

The features of the multiple correlated points may be aggregated in the following manner: mean pooling processing may be performed on the features of the multiple correlated points, that is, the feature data of the multiple correlated points are added and then averaged, so as to obtain the aggregation feature of the target grid.

In S3013, the aggregation feature is activated to obtain the confidence level of each target grid.

After the aggregation feature of each target grid is obtained, the electronic device may activate the aggregation feature using the sigmoid activation function to obtain the confidence level of each target grid.

As another optional embodiment, the electronic device may add one branch to the pre-trained neural network to predict the confidence level of each grid in the gridding scenario space to which the point cloud belongs. When multiple target grids corresponding to one target point are obtained through the pre-trained neural network, the electronic device may directly acquire the confidence level of each of the multiple target grids from the pre-trained neural network. In order to achieve the preceding object, when the preceding pre-trained neural network is trained, the training data further needs to include the actual confidence level of each grid obtained through the sample point cloud, and the pre-trained neural network is trained in conjunction with the actual confidence level of each grid.

In S302, a final target grid corresponding to the target point is determined according to the confidence level.

The electronic device may configure the target grid with the highest confidence level as the final target grid corresponding to the target point. When multiple target grids with the same confidence level exist, one target grid may be randomly selected as the final target grid corresponding to the target point.

In this embodiment, when one target point in the point cloud corresponds to multiple target grids, the electronic device may determine the final target grid corresponding to the target point based on the confidence level of each target grid. When the confidence level of each target grid is determined, the features of multiple correlated points closest to the center point of the target grid are adopted, thereby improving the accuracy of the calculation result of the confidence level of each target grid. Based on the accurate calculation result of the confidence level, the target point can be classified into the corresponding target grid accurately, and then the target point can be classified into the corresponding instance category accurately, thereby improving the accuracy of the point cloud segmentation result.

In an embodiment, in order to implement the point-by-point classification process of the point cloud through the pre-trained neural network, optionally, the output channels of the pre-trained neural network are in a one-to-one correspondence with grids in the gridding scenario space.

Each of the output channels of the pre-trained neural network may be pre-corresponded to a respective grid included in the gridding scenario space. When the output value of one output channel of the pre-trained neural network is 1, it indicates that the point belongs to the grid corresponding to the output channel, and if the point does not belong to the grid corresponding to the output channel, the output value of the output channel is zero. Optionally, the pre-trained neural network may be implemented by a two-layer perceptron, that is, the pre-trained neural network includes a two-layer perceptron. Accordingly, S202 may be: the target grid corresponding to a respective point in the point cloud in the gridding scenario space to which the respective point belongs is obtained through the two-layer perceptron in the pre-trained neural network.

With reference to FIG. 4, it is assumed that the point cloud P includes $N_p$ points, the scenario space to which the point cloud belongs is divided into $N_s*N_s*N_s$ grids in advance, each grid corresponds to a different instance category, and the grids are in a one-to-one correspondence with the output channels of the pre-trained neural network in this embodiment. The electronic device combines the coordinate feature and the channel feature of each point in the point cloud to obtain the initial feature $N_p$ of each point and extracts the local feature of each point from the initial feature $N_p'$ through the feature extraction network (such as PointNet) to obtain the local feature matrix $F_l$ ($F_l \in R^{N_p \times N_l}$). The electronic device inputs the local feature matrix $F_l$ into the preceding pre-trained neural network, projects $F_l$ into a feature space for classification through a multi-layer perceptron (for example, such a perceptron may be a two-layer perceptron with the shape of $(32, N_s^3)$) to output the feature matrix F ($F \in R^{N_p \times N_c}$), and scales the element values in the sigmoid activation function into the interval (0, 1) to obtain the prediction matrix F' ($F \in R^{N_p \times N_s^3}$) of the point cloud, so as to obtain the target grid corresponding to a respective point. $N_p$ is the number of points in the point cloud, $N_l$ is the local feature dimension, $N_c$ is the classification feature dimension, and R is a space represented by one symbol. The row dimension of the prediction matrix F' represents multiple points in the point cloud, and the column dimension represents multiple grids in the gridding scenario to which the point cloud belongs.

Generally, only a few grids in one scenario space correspond to real object instances, and the feature vector (which is in a $N_s^3$ dimension) of the output space of the pre-trained neural network is too sparse. In order to reduce the loss of computing resources, in an embodiment, another pre-trained neural network is provided. The pre-trained neural network includes output channels in the x-axis direction, the y-axis direction, and the z-axis direction. Under the architecture of such a network, the pre-trained neural network may be implemented by three independent three-layer perceptrons, that is, the pre-trained neural network includes a three-layer perceptron corresponding to the output channel in the x-axis direction, a three-layer perceptron corresponding to the output channel in the y-axis direction, and a three-layer perceptron corresponding to the output channel in the z-axis direction.

S202 may include steps S2021 and S2022.

In S2021, a projection location of each point in the point cloud in the x-axis direction, a projection location of each point in the point cloud in the y-axis direction, and a projection location of each point in the point cloud in the z-axis direction are obtained through the pre-trained neural network. Optionally, the electronic device may obtain the projection location of each point in the point cloud in the x-axis direction, the projection location of each point in the point cloud in the y-axis direction, and the projection location of each point in the point cloud in the z-axis direction through the three-layer perceptron corresponding to the output channel in the x-axis direction, the three-layer perceptron corresponding to the output channel in the y-axis direction and the three-layer perceptron corresponding to the output channel in the z-axis direction in the pre-trained neural network, respectively.

In S2022, the target grid corresponding to a respective point in the gridding scenario space to which the respective point belongs is obtained according to the projection location in the x-axis direction, the projection location in the y-axis direction, and the projection location in the z-axis direction.

The electronic device predicts orthogonal projections of respective point in the point cloud in the three directions of the x-axis direction, the y-axis direction and the z-axis direction to determine the target grid corresponding to respective point in the gridding scenario space to which respective point belongs. Assuming that the predicted orthogonal projections of one point in the point cloud in the x-axis direction, the y-axis direction and the z-axis direction are $a_x$, $a_y$, and $a_z$, respectively, based on the projection locations of the point in the x-axis direction, the y-axis direction and the z-axis direction, the corresponding target grid of the point in the gridding scene space to which the point belongs may be determined as $(a_x, a_y, a_z)$.

Figure 5:
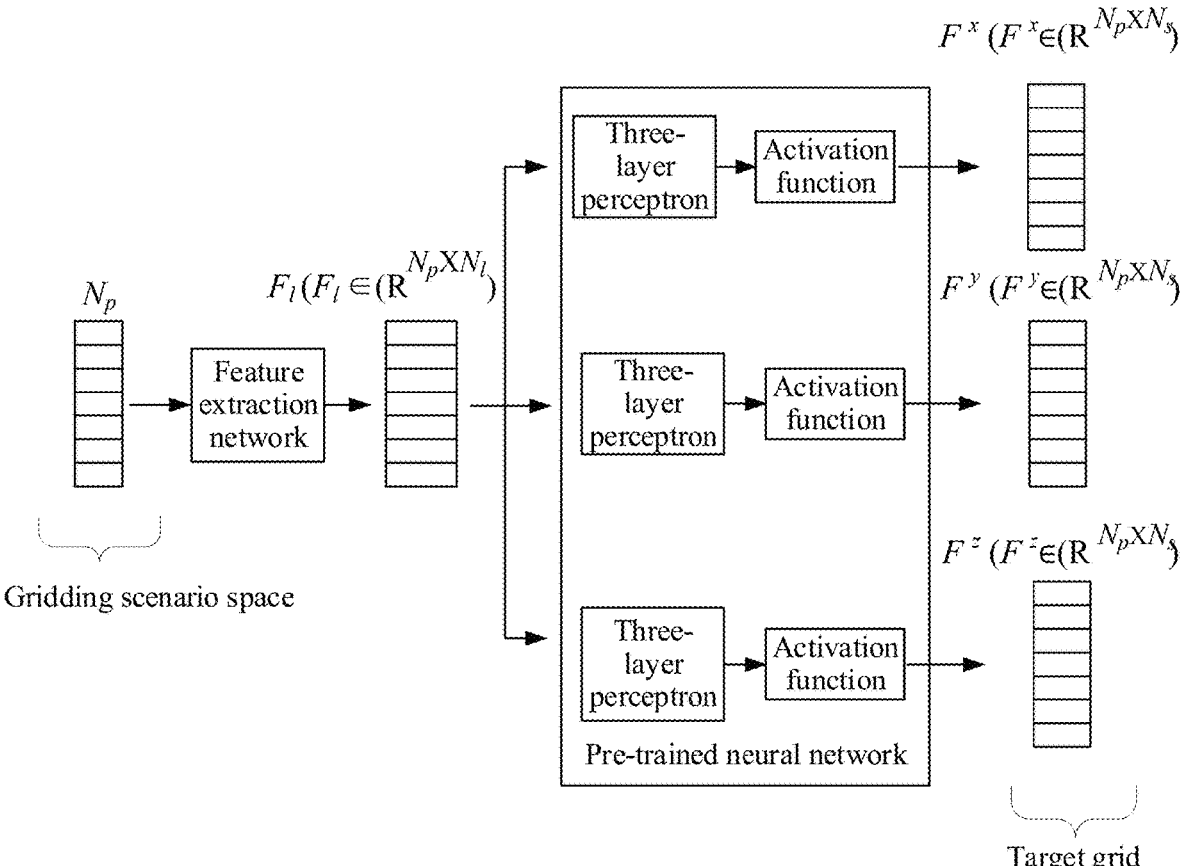
FIG. 5 is another diagram illustrating a principle of a point cloud segmentation process according to an embodiment of the present application.

With reference to FIG. 5, it is assumed that the point cloud P includes $N_p$ points, the scenario space to which the point cloud belongs is divided into $N_s*N_s*N_s$ grids in advance, each grid corresponds to a different instance category, the output channel of the pre-trained neural network in the x-axis direction correspond to the projections of the grids in the x-axis direction, the output channel of the pre-trained neural network in the y-axis direction correspond to the projections of the grids in the y-axis direction, and the output channel of the pre-trained neural network in the z-axis direction correspond to the projections of the grids in the z-axis direction. The electronic device combines the coordinate feature and the channel feature of each point in the point cloud to obtain the initial feature $N_p'$ of each point, and extracts the local feature of each point from the initial feature $N_p'$ through the feature extraction network (such as PointNet) to obtain the local feature matrix $F_l$ ($F_l \in R^{N_p \times N_l}$). The electronic device inputs the local feature matrix $F_l$ into the pre-trained neural network, projects $F_l$ into a feature space for classification through three independent multi-layer perceptrons (for example, such a perceptron may be a three-layer perceptron with the shape of (32, 32, $N_s$)), and performs activation processing using a sigmoid activation function to obtain the prediction matrix $F^x$ ($F^x \in R^{N_p \times N_s}$) of the point cloud in the x-axis direction, the prediction matrix $F^y$ ($F^y \in R^{N_p \times N_s}$) of the point cloud in the y-axis direction and the prediction matrix $F^z$ ($F^z \in R^{N_p \times N_s}$) of the point cloud in the z-axis direction. The electronic device obtains the target grid corresponding to a respective point in the point cloud based on the prediction matrices $F^x$, $F^y$ and $F^z$.

Under the architecture of such a network, the dimension of the output space of the pre-trained neural network is $R^{N_p \times N_s}$, and compared with the dimension $R^{N_p \times N_s^3}$ of the output space, the computation amount in the point-by-point classification process is reduced, and the memory consumption is reduced.

In this embodiment, the electronic device may use pre-trained neural networks with different network architectures to predict the target grid corresponding to respective point in the point cloud in the gridding scenario space to which the respective point belongs, thereby improving the diversification of the point cloud segmentation method. Meanwhile, the pre-trained neural network may include output channels in the x-axis, y-axis and x-axis directions, and when the pre-trained neural network including output channels in three directions is used to predict the target grid corresponding to the respective point, the computation amount in the point-by-point classification process can be reduced, and the consumption of memory can be reduced.

In an embodiment, the acquisition process of the pre-trained neural network is also provided. On the basis of the preceding, optionally, the acquisition process of the pre-trained neural network may be as follows: the sample point cloud is taken as a first input of the pre-trained neural network, the sample target grid corresponding to the sample point cloud in the sample gridding scenario space is taken as a first desired output corresponding to the first input, an actual confidence level of each grid in the sample gridding scenario space is taken as a second desired output corresponding to the first input, and the pre-trained neural network is trained using a cross-entropy loss function.

A sample scenario space may be gridded to obtain the sample gridding scenario space. Meanwhile, the instance category corresponding to each grid in the sample gridding scenario space is defined, and different grids correspond to different instance categories. The sample point cloud is acquired, and the sample target grid corresponding to a respective point in the sample point cloud in the gridding scenario space is marked to obtain the sample target grid corresponding to the sample point cloud. Meanwhile, the actual confidence level of each grid may be calculated based on the sample point cloud and the location information of each grid. The sample point cloud, the sample target grid corresponding to the sample point cloud and the actual confidence level of each grid are used as training data to train the pre-trained neural network. The calculation process of the actual confidence level of each grid may be as follows: for each grid, multiple sample correlated points closest to the center point of the grid are selected from the sample point cloud, the features of multiple sample correlated points are aggregated to obtain the aggregation feature of each grid, and the aggregation feature is activated respectively to obtain the actual confidence level of each grid. Optionally, 32 points closest to the center point may be selected to participate in the calculation process of the confidence level.

After the training data is obtained, the electronic device configures the sample point cloud as the first input of the pre-trained neural network, configures the sample target grid corresponding to the sample point cloud as the first desired output corresponding to the first input, and calculates a first loss value of the cross-entropy loss function; configures the actual confidence level of a respective grid as the second desired output corresponding to the first input, calculates a second loss value of the cross-entropy loss function, and adjusts the parameters of the pre-trained neural network based on the weighted sum of the first loss value and the second loss value until the convergence condition of the loss function is reached, so as to obtain the trained pre-trained neural network.

The calculation formula of the preceding first loss value may be $$L_{cate} = \frac{1}{N_{pos}} \sum_j I_j^* D(F_{ij}, D_{ij})$$

In the preceding calculation formula, $N_{pos}$ represents the number of pos trusted grids (the trusted grids herein may be understood as grids whose confidence level is greater than a preset threshold); $I_j^*$ represents the indicator corresponding to the j-th column of the matrix, where if the grid corresponding to the j-th column is a positive sample, the value of $I_j^*$ is 1, and if the grid corresponding to the j-th column is not a positive sample, the value of $I_j^*$ is 0; $F_{ij}$ represents elements on the i-th row and the j-th column in the prediction matrix F; $D_{ij}$ represents elements on the i-th row and the j-th column in the sample matrix D (the sample matrix D may represent the correspondence between the sample point cloud and the sample target grid); and herein, the distance D (•) between matrices is calculated using Dice Loss.

In this embodiment, the electronic device may train the pre-trained neural network using the cross-entropy loss function based on a large number of sample point clouds, sample target grids corresponding to the sample point clouds in the sample gridding scenario space and the actual confidence level of each grid as the training data so that the trained pre-trained neural network is more accurate. The target grid of each point in the to-be-processed point cloud in the gridding scenario space to which each point belongs may be directly predicted based on the accurate pre-trained neural network, thereby improving the accuracy of the prediction result and the accuracy of the point cloud segmentation result.

The technical solutions provided in the embodiments of the present application can be widely applied to various fields such as autonomous driving, robot control, augmented reality, video instance segmentation, and the like. For example, in indoor robot control, if the scanned point cloud can be divided, the robot can accurately perceive every object and be given navigation and control capabilities.

Figure 6:
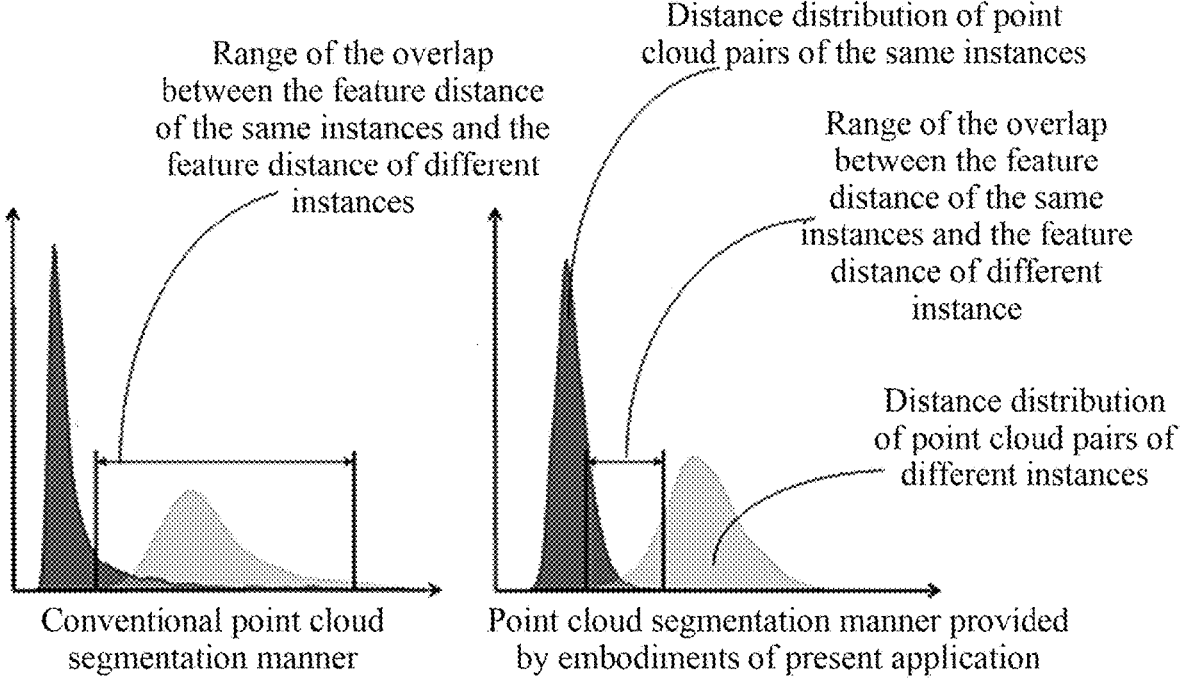
FIG. 6 is a comparison diagram of the feature spatial distance distribution according to an embodiment of the present application.

In order to verify the technical solutions provided in the embodiments of the present application, the technical solutions provided in the embodiments of the present application are compared with the point cloud segmentation manner (such as (Associatively Segmenting Instances and Semantics) ASIS). With reference to FIG. 6, as can be seen from FIG. 6, the point cloud segmentation method provided in the embodiments of the present application can make the range of the overlap between the feature distance of the same instances and the feature distance of different instances smaller, thereby enabling the discrimination between different instances to be higher.

Figure 7:
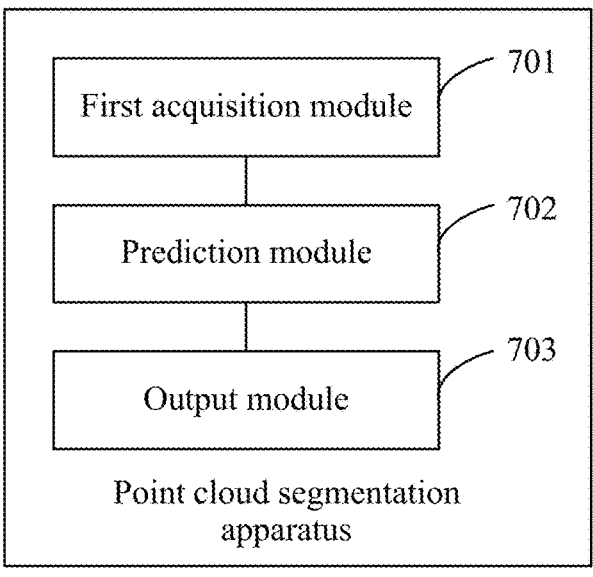
FIG. 7 is a structure diagram of a point cloud segmentation apparatus according to an embodiment of the present application.

FIG. 7 is a structure diagram of a point cloud segmentation apparatus according to an embodiment of the present application. As shown in FIG. 7, the apparatus may include a first acquisition module 701, a prediction module 702, and an output module 703.

The first acquisition module 701 is configured to acquire a to-be-processed point cloud.

The prediction module 702 is configured to obtain, in a gridding scenario space to which a respective point in the point cloud belongs, a target grid corresponding to the respective point through a pre-trained neural network, where the pre-trained neural network is obtained by training a sample point cloud and a sample target grid corresponding to the sample point cloud in a sample gridding scenario space.

The output module 703 is configured to output a point cloud corresponding to the respective instance according to an instance category corresponding to the target grid, where the same target grid has the same instance category.

In the point cloud segmentation apparatus provided in this embodiment of the present application, after the to-be-processed point cloud is acquired, the electronic device obtains the target grid corresponding to a respective point in the point cloud in the gridding scenario space to which the respective point belongs through the pre-trained neural network and outputs the point cloud corresponding to the respective instance according to the instance category corresponding to the target grid. In the process of point cloud segmentation, since the electronic device can directly predict the target grid corresponding to the respective point in the point cloud in the gridding scenario space to which the respective point belongs through the pre-trained neural network and the instance category of the same target grids is the same, each point in the point cloud is directly classified into a clear and specific instance category in the single-stage point-by-point classification manner, thereby avoiding the accumulation of errors brought by multiple stages and improving the accuracy of the segmentation result. Meanwhile, the loss of the computation amount caused by the removal of a large number of redundant bounding boxes in the first stage is avoided, thereby improving the efficiency of point cloud segmentation.

On the basis of the preceding embodiments, optionally, when one target point corresponds to multiple target grids, the apparatus may further include a second acquisition module and a determination module.

The second acquisition module is configured to, after the output module 703 outputs the point cloud corresponding to a respective instance according to the instance category corresponding to the target grid, acquire a confidence level of each of the multiple target grids.

The determination module is configured to determine a final target grid corresponding to the target point according to the confidence level.

On the basis of the preceding embodiments, optionally, the second acquisition module is configured to, for each target grid, select multiple correlated points closest to the center point of the target grid from the point cloud, aggregate features of the multiple correlated points to obtain an aggregation feature of each target grid, and activate the aggregation feature to obtain the confidence level of each target grid.

Optionally, output channels of the pre-trained neural network are in a one-to-one correspondence with grids in the gridding scenario space.

On the basis of the preceding embodiments, optionally, the pre-trained neural network includes an output channel in an x-axis direction, an output channel in a y-axis direction and an output channel in a z-axis direction.

The prediction module 702 is configured to obtain a projection location of each point in the point cloud in the x-axis direction, a projection location of each point in the point cloud in the y-axis direction, and a projection location of each point in the point cloud in the z-axis direction through the pre-trained neural network, and obtain, in the gridding scenario space to which each point belongs, the target grid corresponding to each point according to the projection location of each point in the point cloud in the x-axis direction, the projection location of each point in the point cloud in the y-axis direction, and the projection location of each point in the point cloud in the z-axis direction.

On the basis of the preceding embodiments, optionally, the apparatus may further include a network training module.

The network training module is configured to take the sample point cloud as a first input of the pre-trained neural network, take the sample target grid corresponding to the sample point cloud in the sample gridding scenario space as a first desired output corresponding to the first input, take an actual confidence level of each grid in the sample gridding scenario space as a second desired output corresponding to the first input, and train the pre-trained neural network using a cross-entropy loss function.

On the basis of the preceding embodiments, optionally, the apparatus may further include a combination module and a feature extraction module.

The combination module is configured to, after the first acquisition module 701 acquires the to-be-processed point cloud, combine a coordinate feature and a channel feature of each point in the point cloud to obtain an initial feature of each point.

The feature extraction module is configured to extract a local feature of each point from the initial feature of each point through a feature extraction network.

Figure 8:
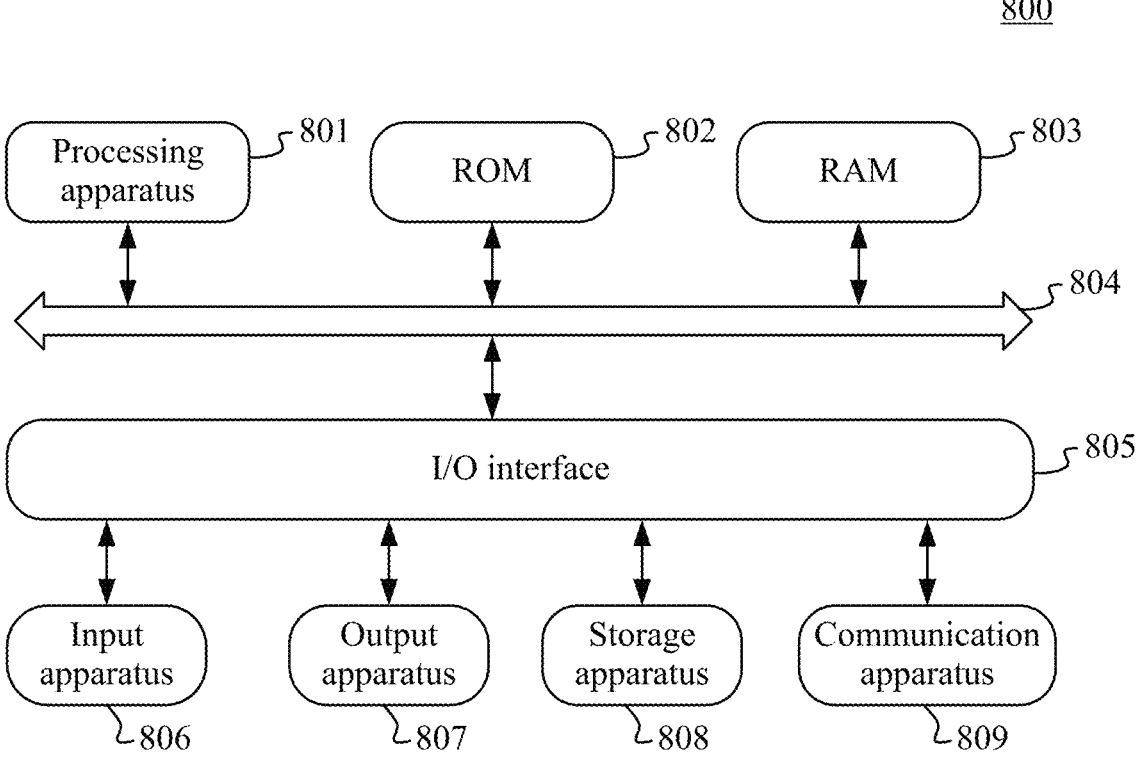
FIG. 8 is a structure diagram of an electronic device according to an embodiment of the present application.

With reference to FIG. 8, FIG. 8 is a structure diagram of an electronic device 800 (such as a terminal or a server in FIG. 1) applicable to implement the embodiments of the present disclosure.

The electronic device shown in FIG. 8 is an example and is not intended to limit the function and usage scope of the embodiments of the present disclosure.

As shown in FIG. 8, the electronic device 800 may include a processing apparatus 801 (such as a central processing unit or a graphics processor). The processing apparatus 801 may perform various suitable actions and processing according to a program stored in a read-only memory (ROM) 802 or a program loaded from a storage apparatus 808 to a random-access memory (RAM) 803. Various programs and data required for the operation of the electronic device 800 are also stored in the RAM 803. The processing apparatus 801, the ROM 802, and the RAM 803 are connected to each other via a bus 804. An input/output (I/O) interface 805 is also connected to the bus 804.

Generally, the following apparatuses may be connected to the I/O interface 805: an input apparatus 806 such as a touch screen, a touchpad, a keyboard, a mouse, a camera, a microphone, an accelerometer and a gyroscope; an output apparatus 807 such as a liquid-crystal display (LCD), a speaker and a vibrator; the storage apparatus 808 such as a magnetic tape and a hard disk; and a communication apparatus 809. The communication apparatus 809 may allow the electronic device 800 to perform wireless or wired communication with other devices to exchange data. Although FIG. 8 shows the electronic device 800 having various apparatuses, not all of the apparatuses shown herein need to be implemented or presented. More or fewer apparatuses may alternatively be implemented or presented.

According to the embodiments of the present disclosure, the processes described above with reference to the flowcharts may be implemented as computer software programs. For example, an embodiment of the present disclosure includes a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 809, may be installed from the storage apparatus 808, or may be installed from the ROM 802. When the computer program is executed by the processing apparatus 801, the preceding functions defined in the method provided in the embodiments of the present disclosure are executed.

The preceding computer-readable medium in the present disclosure may be a computer-readable signal medium, a computer-readable storage medium, or any combination thereof. The storage medium may be a non-transitory storage medium. The computer-readable storage medium, for example, may be, but is not limited to, an electronic, magnetic, optical, electromagnetic, infrared or semiconductor system, apparatus or device, or any combination thereof. The computer-readable storage medium may include, but is not limited to, an electrical connection having one or more wires, a portable computer disk, a hard disk, a RAM, a ROM, an erasable programmable read-only memory (EPROM), a flash memory, an optical fiber, a portable compact disk read-only memory (CD-ROM), an optical storage device, a magnetic storage device, or any suitable combination thereof. In the present disclosure, the computer-readable storage medium may be any tangible medium that contains or stores a program for use by or in connection with an instruction execution system, apparatus or device. In the present disclosure, the computer-readable signal medium may include a propagated data signal with computer-readable program codes embodied therein, for example, in baseband or as part of a carrier wave. Such a propagated data signal may take any of a variety of forms, including, but not limited to, electro-magnetic, optical, or any suitable combination thereof. The computer-readable signal medium may further be any computer-readable medium that is not a computer-readable storage medium and that can communicate, propagate or transport a program for use by or in connection with an instruction execution system, apparatus or device. The program codes included on the computer-readable medium may be transmitted via any suitable medium which includes, but is not limited to, a wire, an optical cable, a radio frequency (RF), or any suitable combination thereof.

In some embodiments, clients and servers may communicate using any currently known or future-developed network protocol, such as HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any currently known or future-developed network.

The computer-readable medium may be included in the preceding electronic device or may exist alone without being assembled into the electronic device.

The computer-readable medium carries one or more programs that, when executed by the electronic device, cause the electronic device to: acquire a to-be-processed point cloud; obtain, in a gridding scenario space to which a respective point in the point cloud belongs, a target grid corresponding to the respective point through a pre-trained neural network, where the pre-trained neural network is obtained by training a sample point cloud and a sample target grid corresponding to the sample point cloud in a sample gridding scenario space; and output a point cloud corresponding to the respective instance according to an instance category corresponding to the target grid, where the same target grid has the same instance category.

Computer program codes for performing the operations in the present disclosure may be written in one or more programming languages or combinations thereof. The preceding programming languages include, but are not limited to, object-oriented programming languages such as Java, Smalltalk and C++, and also include conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any kind of network including a LAN or a WAN, or may be connected to an external computer (for example, via the Internet through an Internet service provider).

The flowcharts and block diagrams in the drawings illustrate system architectures, functions, and operations possibly implemented by the system, method, and computer program product of various embodiments of the present disclosure. In this regard, each block in the flowcharts or block diagrams may represent a module, a program segment, or part of codes, where the module, program segment, or part of codes may contain one or more executable instructions for implementing a prescribed logic function. It is also to be noted that in some alternative implementations, the functions noted in the blocks may occur out of the order noted in the drawings. For example, two successively expressed blocks actually may be executed substantially in parallel, or the blocks may sometimes be executed in a reverse order, depending on the functionality involved. It is also to be noted that each block in the block diagrams and/or flowcharts and a combination of blocks in the block diagrams and/or flowcharts may be implemented by special-purpose hardware-based systems that perform the specified functions or operations, or combinations of special-purpose hardware and computer instructions.

The units involved in the embodiments of the present disclosure may be implemented in a software manner or in a hardware manner. The names of the units do not constitute a limitation on the units themselves. For example, the first acquisition unit may also be described as "a unit for acquiring at least two Internet protocol addresses".

The functions described above herein may be executed, at least in part, by one or more hardware logic components. For example, without limitation, exemplary types of hardware logic components that may be used include: a field-programmable gate array (FPGA), an application-specific integrated circuit (ASIC), application-specific standard parts (ASSP), a system on a chip (SOC), a complex programmable logic device (CPLD), and the like.

In the context of the present disclosure, the machine-readable medium may be a tangible medium that may include or store a program for use by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. The machine-readable storage medium includes an electrical connection based on one or more wires, a portable computer disk, a hard disk, a RAM, a ROM, an EPROM, a flash memory, an optical fiber, a portable CD-ROM, an optical storage device, a magnetic storage device, or any suitable combination thereof.

In an embodiment, a computer device is provided. The computer device includes a memory and a processor. The memory stores a computer program, and when the processor executes the computer program, the processor performs the steps described below.

A to-be-processed point cloud is acquired.

A target grid corresponding to a respective point in the point cloud in a gridding scenario space to which the respective point belongs is obtained through a pre-trained neural network, where the pre-trained neural network is obtained by training a sample point cloud and a sample target grid corresponding to the sample point cloud in a sample gridding scenario space.

A point cloud corresponding to the respective instance is outputted according to an instance category corresponding to the target grid, where the same target grid has the same instance category.

In the point cloud segmentation device provided in this embodiment of the present application, after the to-be-processed point cloud is acquired, the electronic device obtains the target grid corresponding to a respective point in the point cloud in the gridding scenario space to which the respective point belongs through the pre-trained neural network and outputs the point cloud corresponding to the respective instance according to the instance category corresponding to the target grid. In the process of point cloud segmentation, since the electronic device can directly predict the target grid corresponding to a respective point in the point cloud in the gridding scenario space to which the respective point belongs through the pre-trained neural network and the instance category of the same target grids is the same, each point in the point cloud is directly classified into a clear and specific instance category in the single-stage point-by-point classification manner, thereby avoiding the accumulation of errors brought by multiple stages and improving the accuracy of the segmentation result. Meanwhile, the loss of the computation amount caused by the removal of a large number of redundant bounding boxes in the first stage is avoided, thereby improving the efficiency of point cloud segmentation.

When one target point corresponds to multiple target grids, in an embodiment, when the processor executes the computer program, the processor further performs the following steps: a confidence level of each of the multiple target grids is acquired, and a final target grid corresponding to the target point is determined according to the confidence level.

In an embodiment, when the processor executes the computer program, the processor further performs the following steps: for each target grid, multiple correlated points closest to the center point of the target grid are selected from the point cloud, features of the multiple correlated points are aggregated to obtain an aggregation feature of each target grid, and the aggregation feature is activated to obtain the confidence level of each target grid.

Optionally, output channels of the pre-trained neural network are in a one-to-one correspondence with grids in the gridding scenario space.

In an embodiment, the pre-trained neural network includes a two-layer perceptron, and when the processor executes the computer program, the processor further performs the following step: the target grid corresponding to a respective point in the point cloud in the gridding scenario space to which the respective point belongs is obtained through the two-layer perceptron in the pre-trained neural network.

In an embodiment, the pre-trained neural network includes an output channel in an x-axis direction, an output channel in a y-axis direction and an output channel in a z-axis direction, and when the processor executes the computer program, the processor further performs the following steps: a projection location of each point in the point cloud in the x-axis direction, a projection location of each point in the point cloud in the y-axis direction, and a projection location of each point in the point cloud in the z-axis direction are obtained through the pre-trained neural network, and the target grid corresponding to each point in the gridding scenario space to which each point belongs is obtained according to the projection location in the x-axis direction, the projection location in the y-axis direction, and the projection location in the z-axis direction.

In an embodiment, the pre-trained neural network includes a three-layer perceptron corresponding to the output channel in the x-axis direction, a three-layer perceptron corresponding to the output channel in the y-axis direction, and a three-layer perceptron corresponding to the output channel in the z-axis direction, and when the processor executes the computer program, the processor further performs the following step: the projection location of each point in the point cloud in the x-axis direction, the projection location of each point in the point cloud in the y-axis direction, and the projection location of each point in the point cloud in the z-axis direction are obtained through the three-layer perceptrons in the pre-trained neural network.

In an embodiment, when the processor executes the computer program, the processor further performs the following steps: the sample point cloud is taken as a first input of the pre-trained neural network, the sample target grid corresponding to the sample point cloud in the sample gridding scenario space is taken as a first desired output corresponding to the first input, an actual confidence level of each grid in the sample gridding scenario space is taken as a second desired output corresponding to the first input, and the pre-trained neural network is trained using a cross-entropy loss function.

In an embodiment, when the processor executes the computer program, the processor further performs the following steps: a coordinate feature and a channel feature of each point in the point cloud are combined to obtain an initial feature of each point, and a local feature of each point is extracted from the initial feature of each point through a feature extraction network.

The point cloud segmentation apparatus, the device and the storage medium provided in the preceding embodiments can execute the point cloud segmentation method provided by any one of the embodiments of the present disclosure and have function modules and beneficial effects corresponding to the executed method. For technical details not described in detail in the preceding embodiments, reference may be made to the point cloud segmentation method provided by any one of the embodiments of the present application.

According to one or more embodiments of the present disclosure, a point cloud segmentation method is provided. The method includes the steps described below.

A to-be-processed point cloud is acquired.

A target grid corresponding to respective point in the point cloud in a gridding scenario space to which the respective point belongs is obtained through a pre-trained neural network, where the pre-trained neural network is obtained by training a sample point cloud and a sample target grid corresponding to the sample point cloud in a sample gridding scenario space.

A point cloud corresponding to the respective instance is outputted according to an instance category corresponding to the target grid, where the same target grid has the same instance category.

When one target point corresponds to multiple target grids, according to one or more embodiments of the present disclosure, the preceding provided point cloud segmentation method further includes the following steps: a confidence level of each of the multiple target grids is acquired, and a final target grid corresponding to the target point is determined according to the confidence level.

According to one or more embodiments of the present disclosure, the preceding provided point cloud segmentation method further includes the following steps: for each target grid, multiple correlated points closest to the center point of the target grid are selected from the point cloud, features of the multiple correlated points are aggregated to obtain an aggregation feature of each target grid, and the aggregation feature is activated to obtain the confidence level of each target grid.

Optionally, output channels of the pre-trained neural network are in a one-to-one correspondence with grids in the gridding scenario space.

Optionally, the pre-trained neural network includes a two-layer perceptron, and according to one or more embodiments of the present disclosure, the preceding provided point cloud segmentation method further includes the following step: the target grid corresponding to a respective point in the point cloud in the gridding scenario space to which the respective point belongs is obtained through the two-layer perceptron in the pre-trained neural network.

Optionally, the pre-trained neural network includes an output channel in an x-axis direction, an output channel in a y-axis direction and an output channel in a z-axis direction, and according to one or more embodiments of the present disclosure, the preceding provided point cloud segmentation method further includes the following steps: a projection location of each point in the point cloud in the x-axis direction, a projection location of each point in the point cloud in the y-axis direction, and a projection location of each point in the point cloud in the z-axis direction are obtained through the pre-trained neural network, and the target grid corresponding to each point in the gridding scenario space to which each point belongs is obtained according to the projection location in the x-axis direction, the projection location in the y-axis direction, and the projection location in the z-axis direction.

Optionally, the pre-trained neural network includes a three-layer perceptron corresponding to the output channel in the x-axis direction, a three-layer perceptron corresponding to the output channel in the y-axis direction, and a three-layer perceptron corresponding to the output channel in the z-axis direction, and according to one or more embodiments of the present disclosure, the preceding provided point cloud segmentation method further includes the following steps: the projection location of each point in the point cloud in the x-axis direction, the projection location of each point in the point cloud in the y-axis direction, and the projection location of each point in the point cloud in the z-axis direction are obtained through the three-layer perceptrons in the pre-trained neural network.

According to one or more embodiments of the present disclosure, the preceding provided point cloud segmentation method further includes the following steps: the sample point cloud is taken as a first input of the pre-trained neural network, the sample target grid corresponding to the sample point cloud in the sample gridding scenario space is taken as a first desired output corresponding to the first input, an actual confidence level of each grid in the sample gridding scenario space is taken as a second desired output corresponding to the first input, and the pre-trained neural network is trained using a cross-entropy loss function.

According to one or more embodiments of the present disclosure, the preceding provided point cloud segmentation method further includes the following steps: a coordinate feature and a channel feature of each point in the point cloud are combined to obtain an initial feature of each point, and a local feature of each point is extracted from the initial feature of each point through a feature extraction network.

In addition, although multiple operations are depicted in a particular order, this should not be understood as requiring that such operations be performed in the particular order shown or in a sequential order. In certain circumstances, multitasking and parallel processing may be advantageous. Similarly, although implementation details are included in the preceding discussion, these should not be construed as limitations on the scope of the present disclosure. Certain features that are described in the context of separate embodiments can also be implemented in combination in a single embodiment. Conversely, various features that are described in the context of a single embodiment may also be implemented in multiple embodiments separately or in any suitable subcombination.

What is claimed is:

1. A point cloud segmentation method, comprising:

acquiring a to-be-processed point cloud;

obtaining, in a gridding scenario space to which a respective point in the point cloud belongs, a target grid corresponding to the respective point through a pre-trained neural network, wherein the pre-trained neural network is obtained by training a sample point cloud and a sample target grid corresponding to the sample point cloud in a sample gridding scenario space; and outputting a point cloud corresponding to a respective instance according to an instance category corresponding to the target grid, wherein a same target grid has a same instance category;

wherein the pre-trained neural network comprises an output channel in an x-axis direction, an output channel in a y-axis direction and an output channel in a z-axis direction; and the obtaining, in the gridding scenario space to which the respective point in the point cloud belongs, the target grid corresponding to the respective point through the pre-trained neural network comprises:

obtaining a projection location of each point in the point cloud in the x-axis direction, a projection location of the each point in the point cloud in the y-axis direction, and a projection location of the each point in the point cloud in the z-axis direction through the pre-trained neural network; and obtaining, in the gridding scenario space to which the respective point belongs, the target grid corresponding to the respective point according to the projection location of the each point in the point cloud in the x-axis direction, the projection location of the each point in the point cloud in the y-axis direction, and the projection location of the each point in the point cloud in the z-axis direction;

wherein a scenario space to which the point cloud belongs is divided into multiple grids in advance, and each grid occupies a location and represents one instance category;

after a target grid corresponding to a respective point in the point cloud in the gridding scenario space to which the respective point belongs is obtained, each point in the point cloud is divided into a corresponding object instance based on the instance category corresponding to the target grid, and the point cloud corresponding to a respective object instance is outputted according the predefined correspondence between the object instance and the point cloud.

2. The method according to claim 1, wherein in a case where a same target point corresponds to a plurality of target grids, before the outputting the point cloud corresponding to the respective instance according to an instance category corresponding to the target grid, the method further comprises:

acquiring a confidence level of each target grid of the plurality of target grids; and determining a final target grid corresponding to the target point according to the confidence level.

3. The method according to claim 2, wherein the acquiring the confidence level of each target grid of the plurality of target grids comprises:

selecting, for the each target grid, a plurality of correlated points closest to a center point of the target grid from the point cloud;

aggregating features of the plurality of correlated points to obtain an aggregation feature of the each target grid; and activating the aggregation feature to obtain the confidence level of the each target grid.

4. The method according to claim 1, wherein output channels of the pre-trained neural network are in a one-to-one correspondence with grids in the gridding scenario space.

5. The method according to claim 4, wherein the pre-trained neural network comprises a two-layer perceptron; and wherein the obtaining, in a gridding scenario space to which a respective point in the point cloud belongs, a target grid corresponding to the respective point through a pre-trained neural network comprises:

obtaining, in the gridding scenario space to which the respective point in the point cloud belongs, the target grid corresponding to the respective point through the two-layer perceptron in the pre-trained neural network.

6. The method according to claim 1, wherein the pre-trained neural network comprises a three-layer perceptron corresponding to the output channel in the x-axis direction, a three-layer perceptron corresponding to the output channel in the y-axis direction, and a three-layer perceptron corresponding to the output channel in the z-axis direction; and wherein the obtaining a projection location of the each point in the point cloud in the x-axis direction, a projection location of the each point in the point cloud in the y-axis direction, and a projection location of the each point in the point cloud in the z-axis direction through the pre-trained neural network comprises:

obtaining the projection location of the each point in the point cloud in the x-axis direction, the projection location of the each point in the point cloud in the y-axis direction, and the projection location of the each point in the point cloud in the z-axis direction through the three-layer perceptrons in the pre-trained neural network.

7. The method according to claim 1, wherein an acquisition process of the pre-trained neural network comprises:

configuring the sample point cloud as a first input of the pre-trained neural network, configuring the sample target grid corresponding to the sample point cloud in the sample gridding scenario space as a first desired output corresponding to the first input, configuring an actual confidence level of each grid in the sample gridding scenario space as a second desired output corresponding to the first input, and training the pre-trained neural network using a cross-entropy loss function.

8. The method according to claim 1, wherein after the acquiring a to-be-processed point cloud, the method further comprises:

combining a coordinate feature and a channel feature of the each point in the point cloud to obtain an initial feature of the each point; and extracting a local feature of the each point from the initial feature of the each point through a feature extraction network.

9. An electronic device, comprising a memory and a processor, wherein the memory is configured to store a computer program, and the processor, when executing the computer program, performs a point cloud segmentation method, wherein the point cloud segmentation method comprises:

acquiring a to-be-processed point cloud;

obtaining, in a gridding scenario space to which a respective point in the point cloud belongs, a target grid corresponding to the respective point through a pre-trained neural network, wherein the pre-trained neural network is obtained by training a sample point cloud and a sample target grid corresponding to the sample point cloud in a sample gridding scenario space; and outputting a point cloud corresponding to a respective instance according to an instance category corresponding to the target grid, wherein a same target grid has a same instance category;

wherein the pre-trained neural network comprises an output channel in an x-axis direction, an output channel in a y-axis direction and an output channel in a z-axis direction; and the obtaining, in the gridding scenario space to which the respective point in the point cloud belongs, the target grid corresponding to the respective point through the pre-trained neural network comprises:

obtaining a projection location of each point in the point cloud in the x-axis direction, a projection location of the each point in the point cloud in the y-axis direction, and a projection location of the each point in the point cloud in the z-axis direction through the pre-trained neural network; and obtaining, in the gridding scenario space to which the respective point belongs, the target grid corresponding to the respective point according to the projection location of the each point in the point cloud in the x-axis direction, the projection location of the each point in the point cloud in the y-axis direction, and the projection location of the each point in the point cloud in the z-axis direction;

wherein a scenario space to which the point cloud belongs is divided into multiple grids in advance, and each grid occupies a location and represents one instance category;

after a target grid corresponding to a respective point in the point cloud in the gridding scenario space to which the respective point belongs is obtained, each point in the point cloud is divided into a corresponding object instance based on the instance category corresponding to the target grid, and the point cloud corresponding to a respective object instance is outputted according to the predefined correspondence between the object instance and the point cloud.

10. The electronic device according to claim 9, wherein in a case where a same target point corresponds to a plurality of target grids, before the outputting the point cloud corresponding to the respective instance according to an instance category corresponding to the target grid, the method further comprises:

acquiring a confidence level of each target grid of the plurality of target grids; and determining a final target grid corresponding to the target point according to the confidence level.

11. The electronic device according to claim 10, wherein the acquiring the confidence level of each target grid of the plurality of target grids comprises:

selecting, for the each target grid, a plurality of correlated points closest to a center point of the target grid from the point cloud;

aggregating features of the plurality of correlated points to obtain an aggregation feature of the each target grid; and activating the aggregation feature to obtain the confidence level of the each target grid.

12. The electronic device according to claim 9, wherein output channels of the pre-trained neural network are in a one-to-one correspondence with grids in the gridding scenario space.

13. The electronic device according to claim 12, wherein the pre-trained neural network comprises a two-layer perceptron; and wherein the obtaining, in a gridding scenario space to which a respective point in the point cloud belongs, a target grid corresponding to the respective point through a pre-trained neural network comprises:

obtaining, in the gridding scenario space to which the respective point in the point cloud belongs, the target grid corresponding to the respective point through the two-layer perceptron in the pre-trained neural network.

14. The electronic device according to claim 9, wherein the pre-trained neural network comprises a three-layer perceptron corresponding to the output channel in the x-axis direction, a three-layer perceptron corresponding to the output channel in the y-axis direction, and a three-layer perceptron corresponding to the output channel in the z-axis direction; and wherein the obtaining a projection location of the each point in the point cloud in the x-axis direction, a projection location of the each point in the point cloud in the y-axis direction, and a projection location of the each point in the point cloud in the z-axis direction through the pre-trained neural network comprises: obtaining the projection location of the each point in the point cloud in the x-axis direction, the projection location of the each point in the point cloud in the y-axis direction, and the projection location of the each point in the point cloud in the z-axis direction through the three-layer perceptrons in the pre-trained neural network.

15. The electronic device according to claim 9, wherein an acquisition process of the pre-trained neural network comprises:

configuring the sample point cloud as a first input of the pre-trained neural network, configuring the sample target grid corresponding to the sample point cloud in the sample gridding scenario space as a first desired output corresponding to the first input, configuring an actual confidence level of each grid in the sample gridding scenario space as a second desired output corresponding to the first input, and training the pre-trained neural network using a cross-entropy loss function.

16. The electronic device according to claim 9, wherein after the acquiring a to-be-processed point cloud, the method further comprises:

combining a coordinate feature and a channel feature of the each point in the point cloud to obtain an initial feature of the each point; and extracting a local feature of the each point from the initial feature of the each point through a feature extraction network.

17. A non-transitory computer-readable storage medium storing a computer program, wherein when the computer program, when executed by a processor, performs a point cloud segmentation method, wherein the point cloud segmentation method comprises:

acquiring a to-be-processed point cloud;

obtaining, in a gridding scenario space to which a respective point in the point cloud belongs, a target grid corresponding to the respective point through a pre-trained neural network, wherein the pre-trained neural network is obtained by training a sample point cloud and a sample target grid corresponding to the sample point cloud in a sample gridding scenario space; and outputting a point cloud corresponding to a respective instance according to an instance category corresponding to the target grid, wherein a same target grid has a same instance category:

wherein the pre-trained neural network comprises an output channel in an x-axis direction, an output channel in a y-axis direction and an output channel in a z-axis direction; and the obtaining, in the gridding scenario space to which the respective point in the point cloud belongs, the target grid corresponding to the respective point through the pre-trained neural network comprises:

obtaining a projection location of each point in the point cloud in the x-axis direction, a projection location of the each point in the point cloud in the y-axis direction, and a projection location of the each point in the point cloud in the z-axis direction through the pre-trained neural network; and obtaining, in the gridding scenario space to which the respective point belongs, the target grid corresponding to the respective point according to the projection location of the each point in the point cloud in the x-axis direction, the projection location of the each point in the point cloud in the y-axis direction, and the projection location of the each point in the point cloud in the z-axis direction;

wherein a scenario space to which the point cloud belongs is divided into multiple grids in advance, and each grid occupies a location and represents one instance category;

after a target grid corresponding to a respective point in the point cloud in the gridding scenario space to which the respective point belongs is obtained, each point in the point cloud is divided into a corresponding object instance based on the instance category corresponding to the target grid, and the point cloud corresponding to a respective object instance is outputted according the predefined correspondence between the object instance and the point cloud.

18. The non-transitory computer-readable storage medium according to claim 17, wherein in a case where a same target point corresponds to a plurality of target grids, before the outputting the point cloud corresponding to the respective instance according to an instance category corresponding to the target grid, the method further comprises:

acquiring a confidence level of each target grid of the plurality of target grids; and determining a final target grid corresponding to the target point according to the confidence level.

* * * * *